United States Patent [19]
Abel et al.

[11] Patent Number: 5,331,587
[45] Date of Patent: Jul. 19, 1994

[54] SYSTEM AND METHOD FOR RESTORING A CLIPPED SIGNAL

[75] Inventors: Jonathan S. Abel; Julius O. Smith, III, both of Palo Alto, Calif.

[73] Assignee: The Board of Trustees of the Leland Stanford Junior University, Stanford, Calif.

[21] Appl. No.: 882,941

[22] Filed: May 14, 1992

[51] Int. Cl.$^5$ .............................................. G06G 7/02
[52] U.S. Cl. ..................................................... 364/825
[58] Field of Search ............... 364/825, 724.01, 724.10

[56] References Cited

U.S. PATENT DOCUMENTS

| | | | |
|---|---|---|---|
| 4,839,843 | 6/1989 | Velhuis | 364/724.11 |
| 5,224,061 | 6/1993 | Velhuis | 364/724.01 |

*Primary Examiner*—Tan V. Mai
*Attorney, Agent, or Firm*—Flehr, Hohbach, Test, Albritton & Herbert

[57] ABSTRACT

The restoration of a band-limited signal which has undergone amplitude clipping is viewed as recovery from signal drop-outs (missing samples over an interval of time), with the extrapolated signal constrained to lie outside the clipping interval during the drop out. If the signal is oversampled, and the clipping threshold moderate, a unique reconstruction may result from application of signal matching and bandwidth constraints. More generally, however, candidate reconstructions are seen to lie on or inside a polyhedron in the space of sampled signals. In contrast to the case of extrapolation through missing samples, upper and lower limits typically can be placed on the reconstructed signal at every sample point. In light of this finding, methods for choosing a unique reconstruction are achieved. The use of inequality constraints allows practical restoration of clipped signals.

28 Claims, 12 Drawing Sheets

SYSTEM AND METHOD FOR RESTORING A CLIPPED SIGNAL

BACKGROUND OF THE INVENTION

1. Field of the Invention:

The present invention relates generally to restoration of a band-limited signal by signal processing techniques. More particularly, it relates to a system and method for such signal restoration that utilizes inequality constraints in order to restore the signals more accurately.

2. Description of the Prior Art:

Signal interpolation and extrapolation arise in many signal processing applications. The basic problem is to construct unknown signal samples from known samples, using the fact that the signal is band-limited, plus perhaps other information. Example applications include recovering from drop-outs in a digital audio tape, signal reconstruction after nonlinear removal of impulsive noise, and signal inference from incomplete measurements.

A sizeable literature exists on the topics of interpolation and extrapolation. When the known samples of the signal are uniform and sufficiently dense in time that the sample spacing is less than half the period of the highest frequency in the signal, band-limited interpolation provides a unique reconstruction for all time. Band-limited interpolation can be seen as replacing the known samples by a superposition of sinc functions each having spectral width equal to the signal bandwidth.

When the Nyquist sampling theorem is violated, it becomes necessary to use extrapolation techniques. Because every finite-bandwidth signal is analytic, a band-limited signal can be extrapolated for all time from any open set. The extrapolation is simply a Taylor series expansion about any point in the set. However, incompletely sampled signals cannot be so extrapolated. Extrapolation over missing, nonzero samples requires more information than the signal band limits.

A large number of extrapolation techniques construct the unique minimum norm signal which interpolates the known samples and satisfies the band-limited condition. Usually the $L_2$ norm is minimized, yielding a minimum energy extrapolation. Minimum-norm extrapolation of lowpass signals provides a reconstruction very similar to that obtained using band-limited interpolation where zeros have been inserted for the missing samples; i.e., the extrapolation tends to go to zero after an interval approximately equal to the reciprocal of the assumed signal bandwidth. This seems reasonable when the extrapolation is viewed as a superposition of sinc functions corresponding to the signal bandwidth, along with a second-order correction that adjusts the sinc function heights so as to precisely match the known samples.

Some extrapolation techniques have been devised to make use of other a priori knowledge besides bandwidth. For example, weighting functions can be introduced in both the time and frequency domains to alter the relative strength of norm minimization versus time and frequency. Linear prediction has also been used to extrapolate the signal on the basis of correlation information measured using the available samples. In general, any known properties of the signal can help to improve the quality of its restoration from an incomplete set of samples.

SUMMARY OF THE INVENTION

Useful clipped signal restoration may be achieved through use of the novel system and method for restoring a clipped signal herein disclosed. A system for restoring at least an approximation of a clipped signal in accordance with this invention has a signal restorer employing inequality constraints. A means supplies the clipped signal to said signal restorer. A means supplies inequality constraints to the signal restorer. A means supplies known information about the original signal in a form which can include weighting matrices to the signal restorer. The signal restorer is configured to utilize the supplied inequality constraints and known information to restore the clipped signal.

A method for restoring at least an approximation of a clipped signal in accordance with the invention includes supplying the clipped signal to a signal restorer. Inequality constraints are supplied to the signal restorer. Known information about the original signal is supplied to the signal restorer. The supplied inequality constraints and known information are used by the signal restorer to restore the clipped signal.

Toward the attainment of the foregoing, the following and related advantages and features of the invention should be more readily apparent to those skilled in the art, after review of the following more detailed description of the invention, taken together with the drawings:

BRIEF DESCRIPTION OF THE DRAWINGS

FIGS. 1-6 are waveform diagrams useful for understanding the invention.

FIG. 7 is a generalized block diagram of a system in accordance with the invention.

DETAILED DESCRIPTION OF THE INVENTION

Signal Constraints

Figure 1:
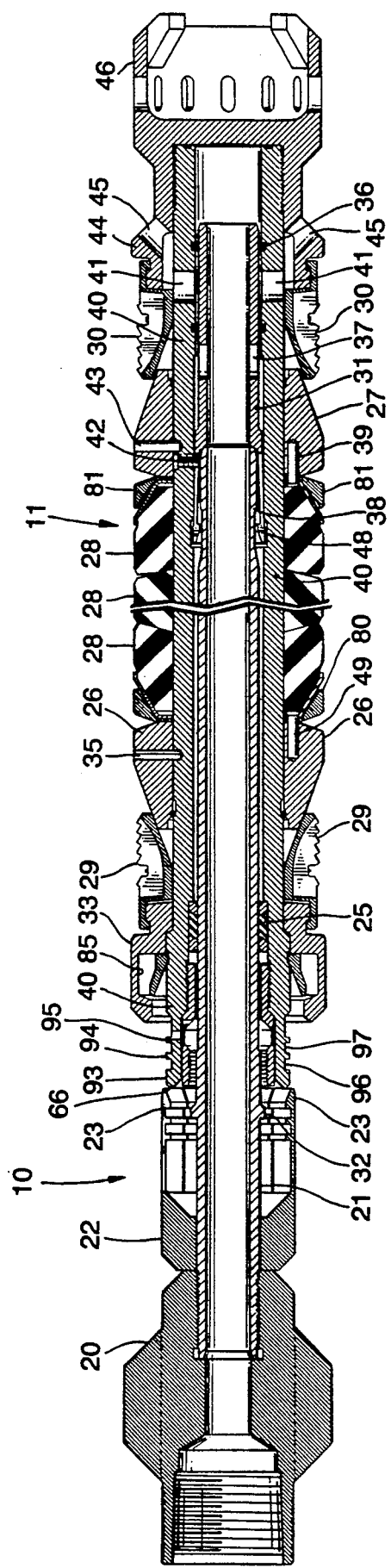

The problem considered here may be stated as follows (see FIG. 1). A band-limited signal s(t) is amplitude limited, resulting in the clipped signal c(t), $$c(t) = \begin{cases} L, & s(t) \geq L \\ s(t), & |s(t)| < L \\ -L, & s(t) \leq -L \end{cases} \quad (1)$$

Given samples of c(t), knowledge of the band occupied by s(t), and knowledge of the amplitude limiting characteristic it is desired to recover s(t).

Denote by c(i) the ith sample of the clipped signal, and by c the column matrix containing the N clipped signal samples. Similarly, s and r denote the original signal and the restored signals. Knowledge of c and the frequency band occupied by s imposes the following constraints on the restored signal r.

$$T_s(r - c) = 0, \quad (2)$$

$$\begin{bmatrix} T_+ \\ -T_- \end{bmatrix} r \geq L\mathbf{1}, \quad (3)$$

$$B^\perp r = 0, \quad (4)$$

where 1 is a vector containing all ones, and L is the clipping threshold. Above, $T_s$ projects onto the space of known samples; it is obtained from the $N \times N$ identity matrix by deleting rows corresponding to the unknown (i.e. clipped) samples. The constraint (2) then states that unclipped samples in c are matched by the corresponding samples in r. The matrices $T+$ and $T-$, in a manner similar to that of $T_s$, select samples corresponding to samples of c which have been limited to the positive threshold L and the negative threshold $-L$, respectively. Note that in general the clipping characteristic, and therefore the inequality contraints (3) may be a function of the signal. Conditions (2) and (3) ensure that if r were clipped, it would coincide with c. The matrix $B^\perp$ is defined as $I-B$, where B projects onto the space of signals which are band-limited to the assumed spectral support of s(t); it may be obtained from the DFT matrix by zeroing rows corresponding to out-of-band frequencies. Accordingly, the constraint (4) requires the reconstruction r to be band-limited.

Restoration Uniqueness

The question arises as to whether the constraints (2)–(4) are sufficient to specify a unique reconstruction r? If not, what is the nature of the space of signals matching the constraints?

Denote by $N_c$ the number of clipped samples, and by $N_b$ the dimension of the space of band-limited signals, i.e. the rank of B or the number of nonzero DFT bins. Then the number of "unknowns" in this problem is $N_c$ while the number of "constraints" is $N-N_b$ (considering only constraints arising from the band-limited assumption). Thus, if $N_c > N-N_b$, the reconstruction is not unique. The addition of the amplitude constraints (3) can dramatically reduce the size of this admissible solution space, leaving a set of solutions much closer to the true signal.

We write the restored signal as the sum of the clipped signal and the unknown samples z, $$r = c + T_c z, \quad (5)$$

$T_c$ being an $N \times N_c$ matrix (consisting of columns of $\pm I$) which distributes the unknown samples to the appropriate (clipped) sample times, negating entries corresponding to negative amplitudes. This formulation guarantees constraint (2) by construction, and the remaining constraints (3) and (4) on the N samples of r now reduce to the following constraints on the $N_c$ samples of z.

$$z \geq 0, \quad (6)$$

$$B^\perp T_c z = -B^\perp c. \quad (7)$$

Figure 2:
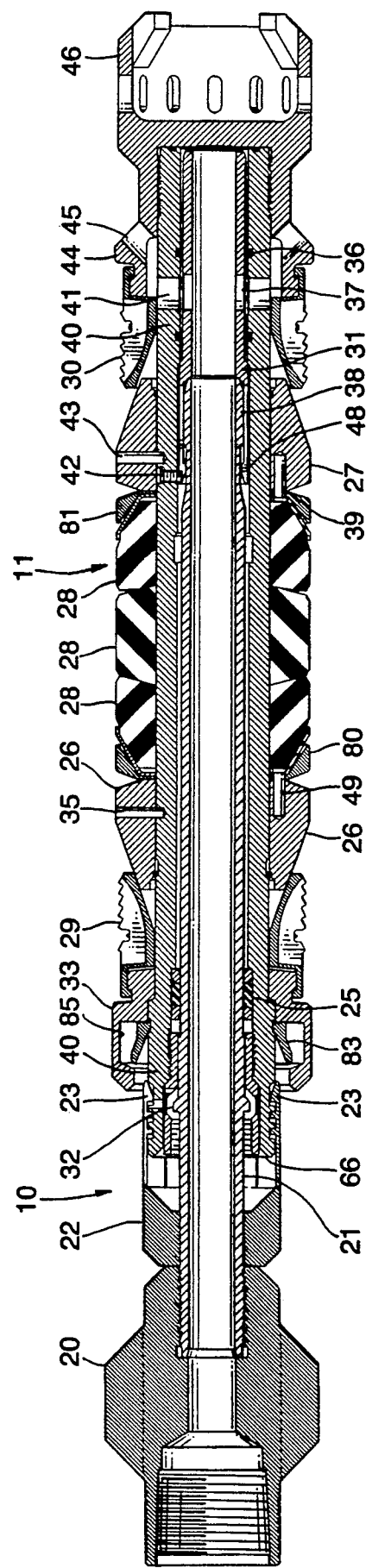

As is clear from (7), when the rank of $B^\perp T_c$ is $N_c$ or greater, the reconstruction is uniquely specified. Uniqueness of the reconstruction (without the need for amplitude constraints) is likely when clipping is slight (large L) or the signal is heavily over-sampled; i.e., when there are at least as many zeros in the DFT of s as there are clipped samples. This situation is illustrated in FIG. 2 in which the original and clipped signals and their spectra are shown along with the restored signal and its spectrum. Note that even though 70% of the samples have been clipped, the signal s is uniquely and accurately restored by making use of the knowledge that the signal c is sampled at four times the Nyquist rate.

Should the rank of $B^\perp T_c$ be less than $N_c$, the restoration r will not be unique. In this case the linear constraints on z (6)–(7) form a convex polytope of dimension $N_c$ rank ($B^\perp$). The polytope specified by (6)–(7) is bounded in all but degenerate cases, and is therefore a convex polyhedron.

That the space of unknown samples z is in general bounded means that the space of possible restorations r is bounded. That is, at any given sample, (6) and (7) place upper and lower limits on the value attained by that sample. This is in sharp contrast to the case of interpolation through missing samples, in which the reconstruction may take on virtually any value at missing samples, should the constraints (2) and (4) fail to uniquely specify the signal.

Figure 3:
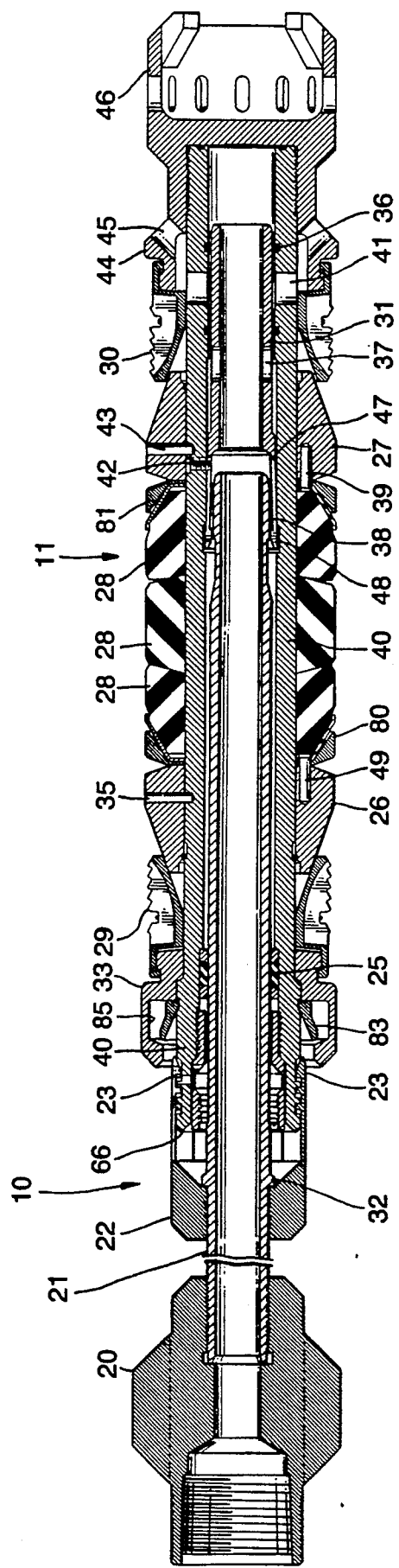

We illustrate this result using the example shown in FIG. 3. In the bottom portion of the figure, the original and clipped signals appear along with a restored signal. The restored signal is the band-limited signal of minimum energy which passes through the known signal points; it was not constrained to exceed the clipping threshold at the unknown samples, and in fact it doesn't.

For this example, after applying the band-limiting and signal matching constraints, there remain three degrees of freedom in choosing a reconstruction. In the upper portion of FIG. 3, three signals appear which are zero at known sample times and are properly band-limited. Ignoring momentarily the inequality constraints $z \geq 0$, any amount of any of these three signals added to the restoration shown is also a valid restoration. In the absence of the inequality constraints, therefore, signals may be constructed which have various amplitudes at clipped sample points while meeting all bandwidth and signal matching constraints. For this reason, in the case of missing samples as opposed to clipped, a minimum energy or other minimum norm criterion is generally imposed to select a unique reconstruction.

Figure 4:
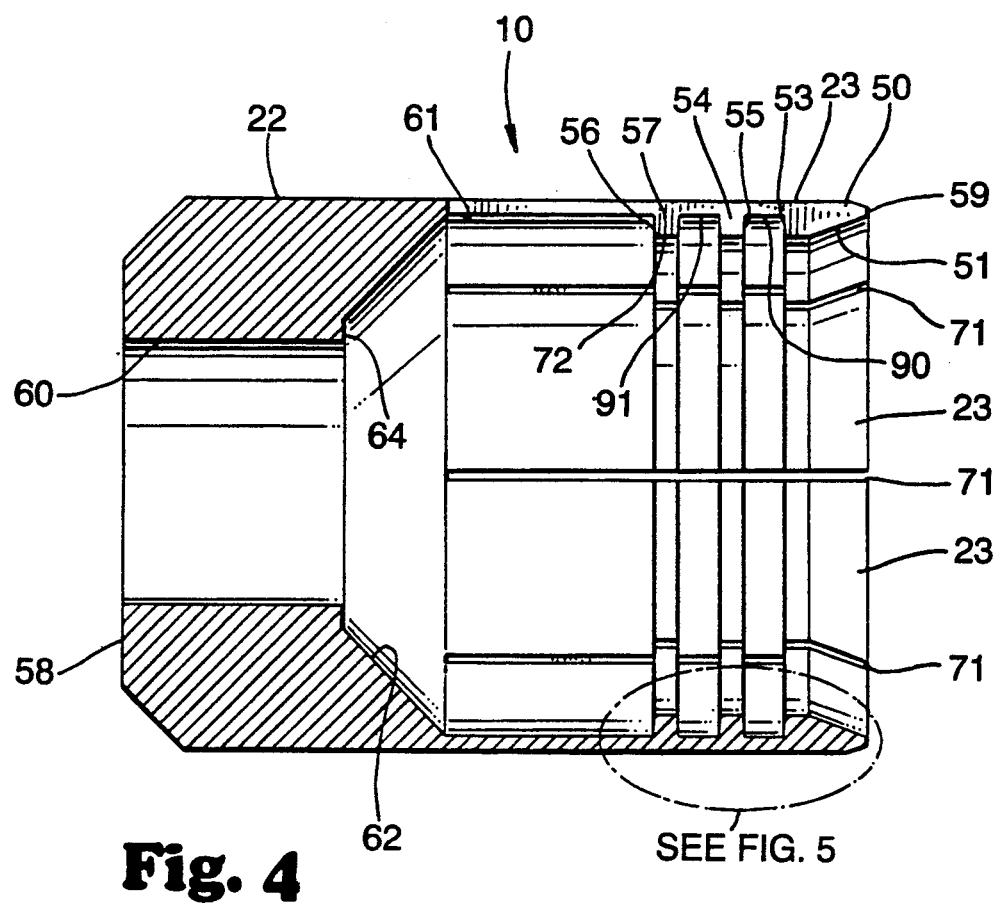

On the other hand, in the presence of the inequality constraints (6), the reconstructed signal is typically limited to a bounded convex subspace in the space of N-long sampled signals. For the signal considered in FIG. 3, these limits are shown in FIG. 4. It still remains to choose a particular reconstruction from among those available, as discussed below.

Signal Restoration Methods

Figure 5:
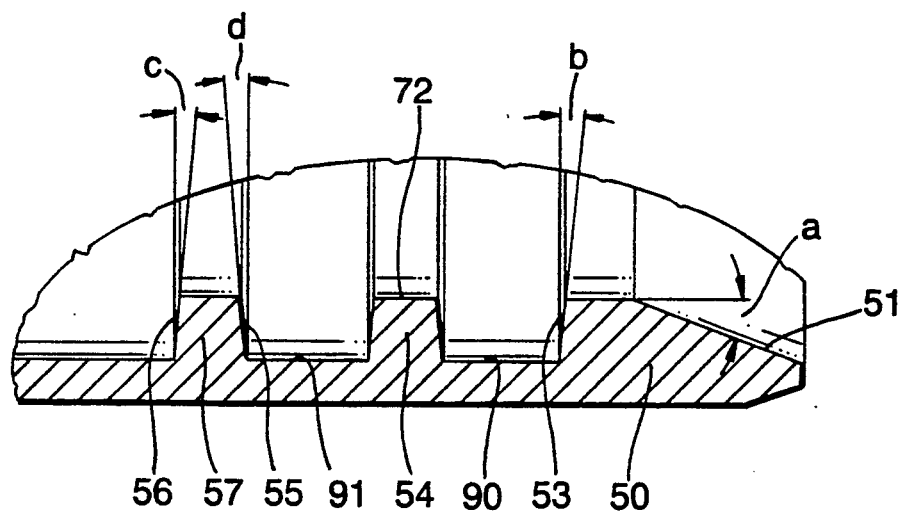

As illustrated in FIG. 5 for the case of two unknown samples with one degree of freedom, the reconstruction must lie on a polyhedron, in this case a line segment. Several choices for the unknown samples are shown. The z with minimum $L_\infty$ norm will minimize the maximum added amplitude. Picking z to have minimum weighted $L_1$ or $L_2$ norm will result in restorations having $L_1$ or $L_2$ weighted norm.

In any event, the constraint forms a convex subspace over which any convex signal norm achieves a global minimum. In the case of the $L_1$ norm, the computationally efficient simplex method may be used to compute r. For the $L_2$ and $L_\infty$ norms, computationally efficient procedures are also available.

In FIG. 6, the minimum and maximum energy restorations for the example of FIG. 3 are shown. Note that these restorations do not coincide with the limits of the reconstruction envelope.

The Noisy Case

Should s be noisy, it may have energy outside the signal band. In addition, unclipped signal samples will be perturbed. In this case the equality and inequality constraints above should be relaxed. We propose computing r as an approximately band-limited signal, passing close to the known signal samples, while maintaining the amplitude constraints at the clipped samples.

Signal Restoration Systems

FIG. 7 shows a signal restorer 10 with its inputs and outputs. The signal to be restored is supplied at input 12. Inequality constraints, such as clipping characteristic applied to the signal are supplied at input 14. Such inequality constraints may be based on the assumption, for example, that amplification of the original signal is linear over its amplitude, but attenuated at the clipping level. If the amplification is nonlinear and known, the inverse of the nonlinear function is applied. The inequality constraints could be essentially any parameterized signal constraint applied to the original signal. The third input at 16 embodies other known information about the original signal, such as its bandwidth or spectral shape. Spectral or temporal weighting in the form of weighting matrices appropriate to the signal due to its nature are used. The known information may be based on physical reasons for preferring certain signal restoration solutions. Such additional information identifies a family of signals that would meet the inequality constraints to produce the signal to be restored. The signal restorer 10 functions to select a signal representing the restored signal supplied as output 18 from such a family of signals.

Figure 8A:
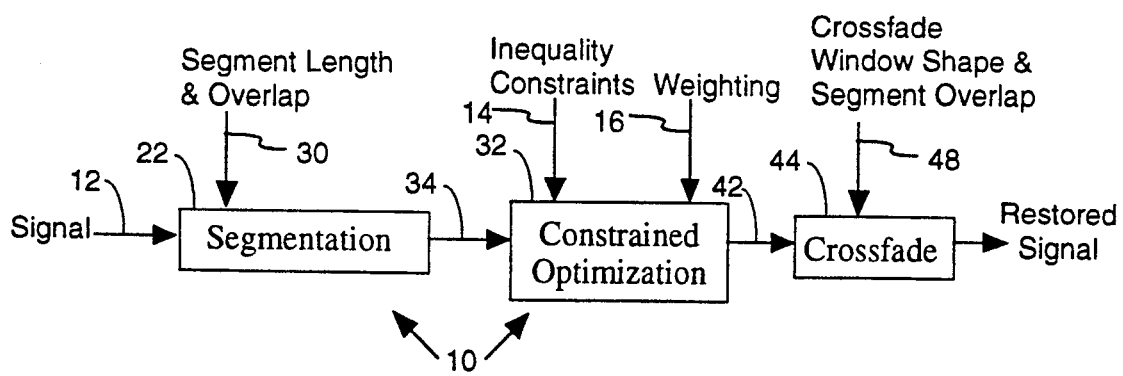
FIGS. 8A and 8B are a more detailed block diagram of the system of FIG. 7 and waveform diagrams useful for understanding operation of the FIG. 8A system.
Figure 8B:
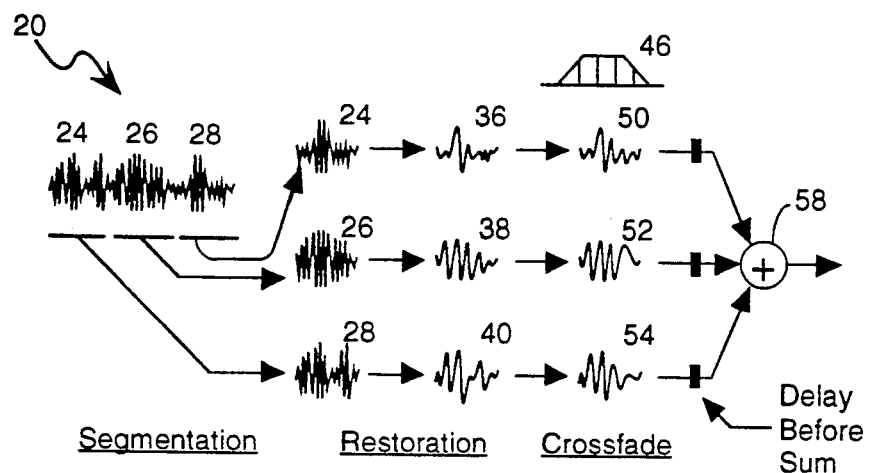

FIGS. 8A and 8B show details of one form of the signal restorer 10 of FIG. 7. Signal 20 to be restored at 12 is supplied to a segmenter 22, which separates the signal into segments 24, 26 and 28. Segment length and overlap inputs are supplied to the segmenter 22 at 30. The signal segments 24, 26 and 28 are supplied from the segmenter 22 to constrained optimizer 32 at 34. The inequality constraints and weighting inputs are supplied at 14 and 16 to the optimizer 32. The optimizer 32 restores the signal segments 24, 26 and 28 separately to give restored signal segments 36, 38 and 40, which are supplied at 42 to cross fader 44. The cross fader 44 attenuates the restored signal segments 36, 38 and 40 at their beginning and end to avoid redundancy when the segments are overlapped to produce the restored signal. The shape of cross fade window 46 and the amount of segment 36, 38 and 40 overlap for the restored signal are supplied to the cross fader 44 at 48. The shape shown for the cross fade window 46 also reflects the fact that the center part of the segments 36, 38 and 40 is of most interest for restoration. The cross fader produces attenuated restored signal segments 50, 52 and 54, which are delayed at 56 and summed at 58 to produce the restored signal.

In the constrained optimizer 32, a first method uses the sample variables governed by Equation (5) discussed above. Unclipped samples are matched by construction. The variable z, and therefore the restored signal r, is found by constrained optimization as follows:

$$\min_z J_{(z)} \text{ subject to } z \geq 0$$
$$B^\perp(T_c z + c) = 0$$

Here, $J_{(z)}$ is given by $\|r\|_w$, the weighted norm of the restored signal. If the $L_1$ norm is chosen, since $z \geq 0$, the minimization problem becomes $$\min_z wT_z \text{ subject to } z \geq 0, \text{ and } B^\perp(T_c z + c) = 0$$

which may be solved using the simplex method or other computationally efficient linear programming methods. Using the $L_2$ norm, J(z) becomes the weighted energy in the restored signal. Using the $L_\infty$ norm, the restored signal is the one minimizing the maximum deviation.

Note that if $B^\perp T_c$ has full column rank (generally true when $N_c < N - N_b$), then the band limiting constraint determines the solution. ($N_c$ is the number of clipped samples, N is the number of samples and $N_b$ is the signal bandwidth.) Otherwise, $$z = -(B^\perp T_c) \backslash c + Q \cdot \alpha,$$

where $(B^\perp T_c) \backslash c$ is the minimum norm solution to $B^\perp T_c z = c$, Q is an orthonormal matrix spanning the null space of $(B^\perp T_c)$ and $\alpha$ is a column of constants to be determined. Since the columns of Q are orthogonal, band limited and zero at known sample values, the minimization problem is easily reformulated in terms of $\alpha$.

A second method for the constrained optimizer 32 uses a band limited basis or "additive synthesis." In the relationship $$r = \Gamma x,$$

$\Gamma$ is the band limited basis (truncated or windowed sinc functions work well) and x represents unknown coefficients. Note that $\Gamma(\Gamma^T\Gamma)^{-1}\Gamma^T = B$, where B is a projection onto band limited signals. By construction, the restored signal is band limited. The optimization becomes $$\min_x J(x) \text{ subject to } T_s(r-c) = 0,$$
$$T_c(r-c) \geq 0$$

where the cost function to be minimized is $$J(x) = \|r\|_w.$$

The same sorts of solutions as used in the first method are applicable.

Both the first and the second methods fail when the original signal contains energy outside the band. In both, the equality constraint cannot be met. In the second method, the equality constraint may be loosened by adding it to the cost function:

$$\min_x J(x) = \|r\|_W + \|T_s(r-c)\|_W$$

such that $T_c(r-c) \geq 0$.

However, this may fail since $\{x:T_c(Bx-c)\geq 0\}$ may be the empty set.

A third, hybrid approach is preferred in the case that the signal contains out-of-band components. The restored signal is band limited by construction $$r = B(c + T_c z), \text{ and the constrained optimization becomes}$$
$$\min_z J(z) S \cdot t \cdot z \geq 0$$

where the cost $J(z)$ is given by $$J(z) = \|c + T_c z\|_W + \|T_s(r-c)\|_W$$

the $L_2$ norm being preferred. The first term in $J(z)$ represents weighted signal energy, and the second term represents weighted error in matching the unclipped samples. A solution always exists since the constraints specify a non empty convex set and the cost is convex in z.

The weighting W may be chosen to emphasize certain frequency or time components over others. It may be desired to minimize the bandwidth of the restored signal and W would be chosen as, say, $W=FDF^T$, F being the Fourier transform matrix and D emphasizing high frequencies over low ones.

The weighting V may be used to emphasize the fit to certain unclipped samples over others. It is used in cross fading to de-weight the fit at the signal block boundaries. After any non-linear transformation of the data, as in FIG. 9, the measurement noise is a function of signal amplitude. V may be adjusted to accomodate such variations:

$$V = \text{diag}\{v_i\}, v_i = 1/\sigma_i^2,$$

where $\sigma_i^2$ is the variance of the noise of sample i. For the case of FIG. 9, $$\sigma_i^2 = \sigma^2/(\partial \phi/\partial x),$$

where $\sigma^2$ is measurement variance, which may be set to 1 for weighting. Noise which is correlated from sample to sample may be similarly handled.

Figure 9:
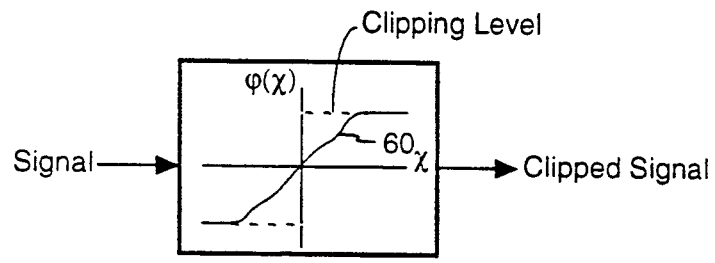
FIG. 9 is a waveform diagram useful for further understanding of the invention.
Figure 10:
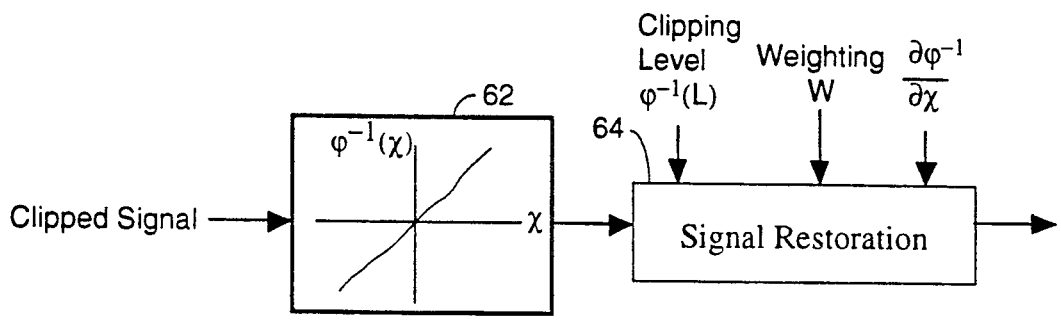
FIG. 10 is a block diagram of another embodiment of a system in accordance with the invention for restoring the signal shown in the waveform diagram of FIG. 9.

In FIG. 9, signal 60 is clipped at level $\pm L$ and has a known measurement non-linearity. As shown in FIG. 10, the clipped signal 60 has the inverse $\phi^{-1}(x)$ of the non-linearity applied to it at 62 and undergoes restoration in signal restorer 64. Additional inputs to the signal restorer 64 are $\partial \phi^{-1}/\partial x$, used to determine the weighting V and $\phi^{-1}(L)$, the clipping level.

Figure 11:
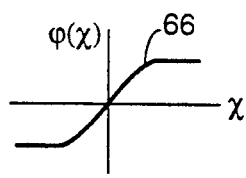
FIG. 11 is a waveform diagram useful for further understanding of the invention.
Figure 12:
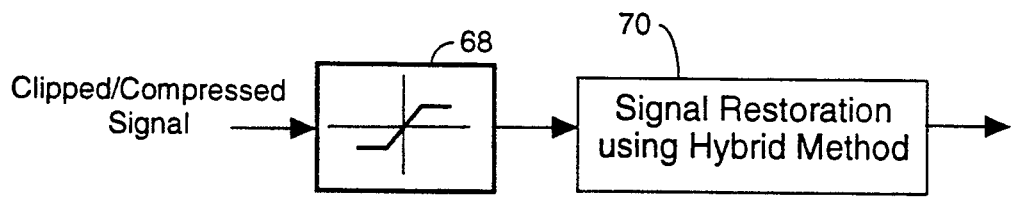
FIG. 12 is a block diagram of another embodiment of a system in accordance with the invention for restoring the signal shown in the waveform diagram of FIG. 11.

FIG. 11 shows a signal 66 with compressing-type nonlinearity. Near $x=0$, $\phi(x) \approx x$. Away from $x=0$, $|\phi|$ has a negative second derivative approaching maximum absolute levels. FIG. 12 shows restoration of the clipped and compressed signal 66. Digital clipping is carried out at 68 in the range over which $\phi$ is approximately linear. The signal is then restored at 70 using the third (hybrid) method discussed above.

Note that for $\phi(x)$ as in FIG. 11, $$|x| \geq |\phi(x)|.$$

Also, $\phi(s(t))$ will have greater bandwidth than $s(t)$. Therefore, if the details of $\phi$ were note that unknown to an extent that simply inverting the measurement nonlinearity is inappropriate, the following formulation may be useful.

$$r = c + z$$
$$\min_z J(z) S \cdot t \cdot z \geq 0$$
$$J(z) = \|c + z\|_W + \|z\|_V$$

W is set such that the first term to the right is a measure of bandwidth, W being a "weak" high-pass filter. For the second term to the right, the restored signal should match the input at small signal levels, and not so much so at high signal levels. V should be set accordingly. As above, if the $L_2$ norm is used, standard quadratic programming methods may be employed to specify z.

Figure 13:
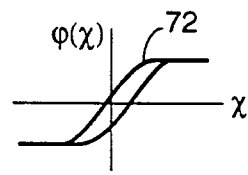
FIG. 13 is a waveform diagram useful for further understanding of the invention.

FIG. 13 shows a clipping nonlinearity 72 with hysteresis. If the signal 72 has hysteresis, the methods above can be used, accounting for the hysteresis by adjusting the clipping levels and weighting matrices to be sensitive to the signal derivative, i.e., which part of the hysteresis curve the signal 72 is in. In the case of restoring magnetic media clipping, the hysteresis curve may be determined.

Figure 14:
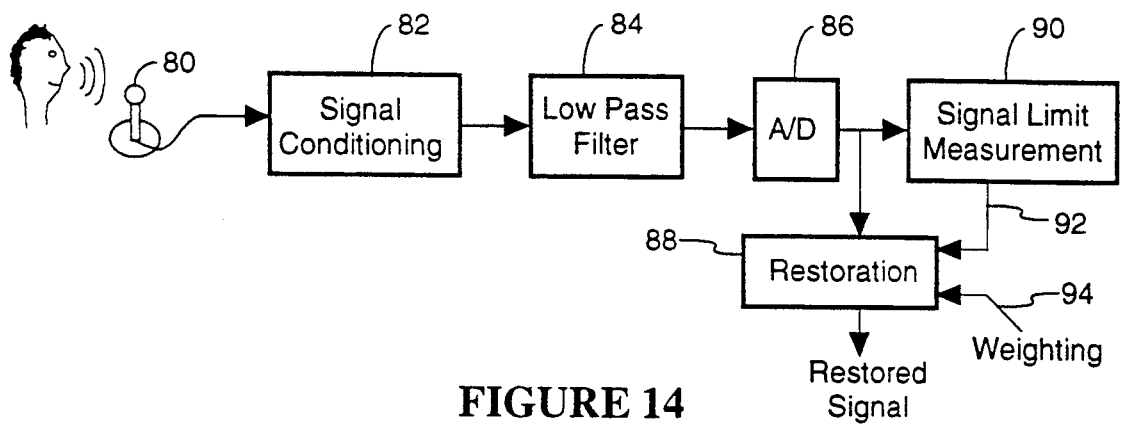
FIG. 14 is a block diagram of another embodiment of a system in accordance with the invention.

FIG. 14 shows use of the invention in a digital recording application. A voice input from microphone 80 undergoes signal conditioning at 82 and low-pass (antialiasing) filtering at 84. The resulting signal is converted to digital form with A/D converter 86. The resulting signal may be clipped and is therefore supplied to signal restorer 88. The digital signal is also supplied for signal limit measurement at 90 to provide a limit measurement to the signal restorer 88 at 92. An additional weighting input determined by $f_c$ and the signal conditioning is provided to the signal restorer 88 at 94.

Figure 15:
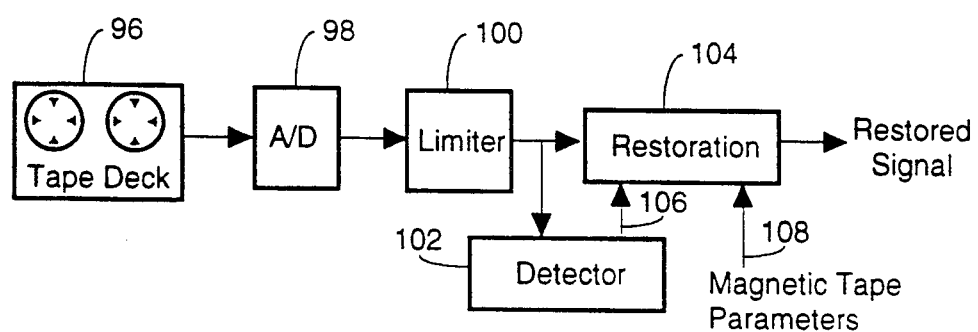
FIG. 15 is a block diagram of another embodiment of a system in accordance with the invention for restoring the signal shown in the waveform diagram of FIG. 13.
Figure 16:
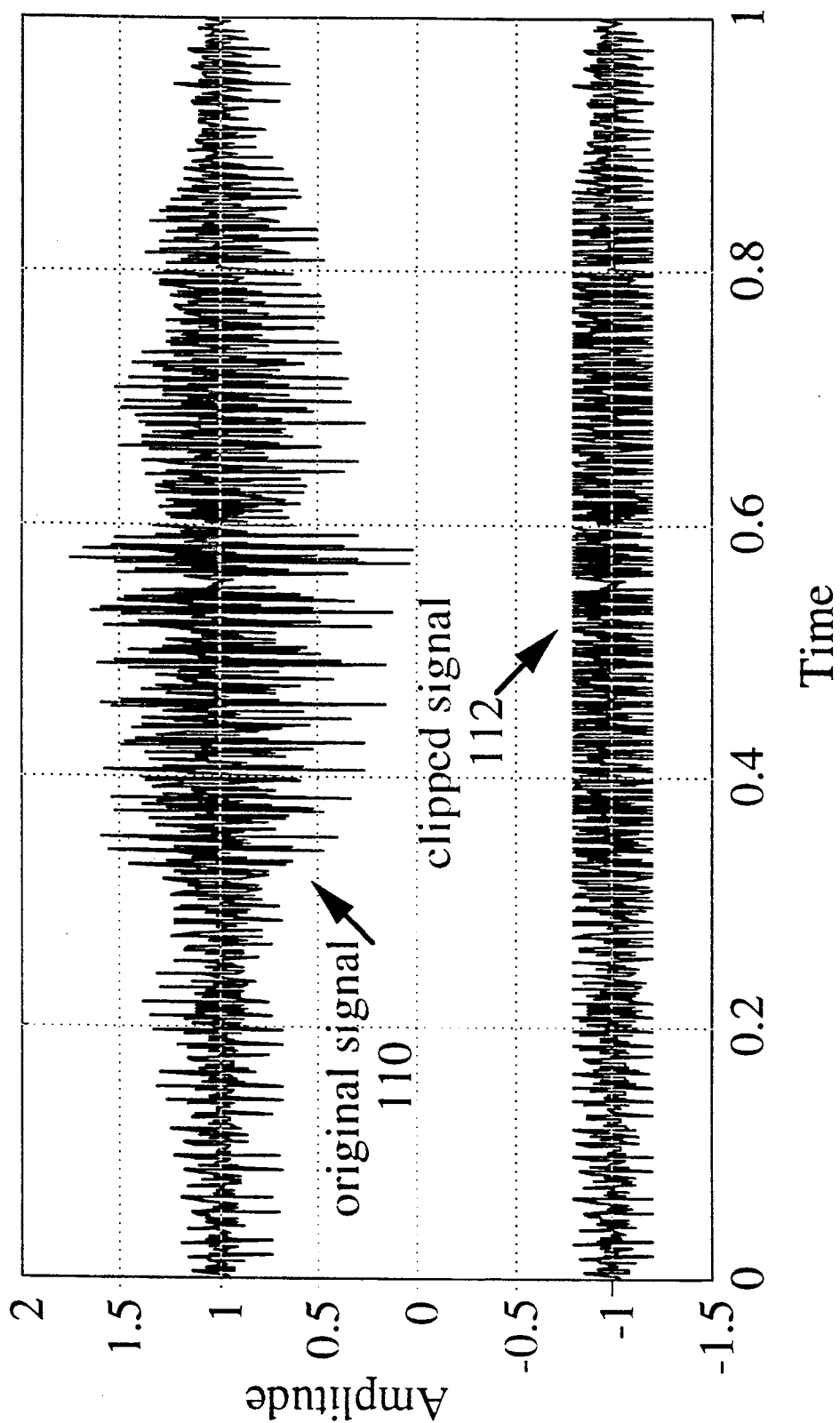
FIGS. 16-21 are waveform diagrams presenting results obtained with the invention.

FIG. 15 shows restoration of a signal from a magnetic tape deck 96. The signal is digitized at A/D converter 98 and supplied to limiter 100. The output of the limiter 100 is supplied to detector 102 for determining inequality constraints and to signal restorer 104. The inequality constraints are supplied to the signal restorer 104 at 106, along with magnetic tape parameters, such as hysteresis, equalization and the like at 108.

Figure 17:
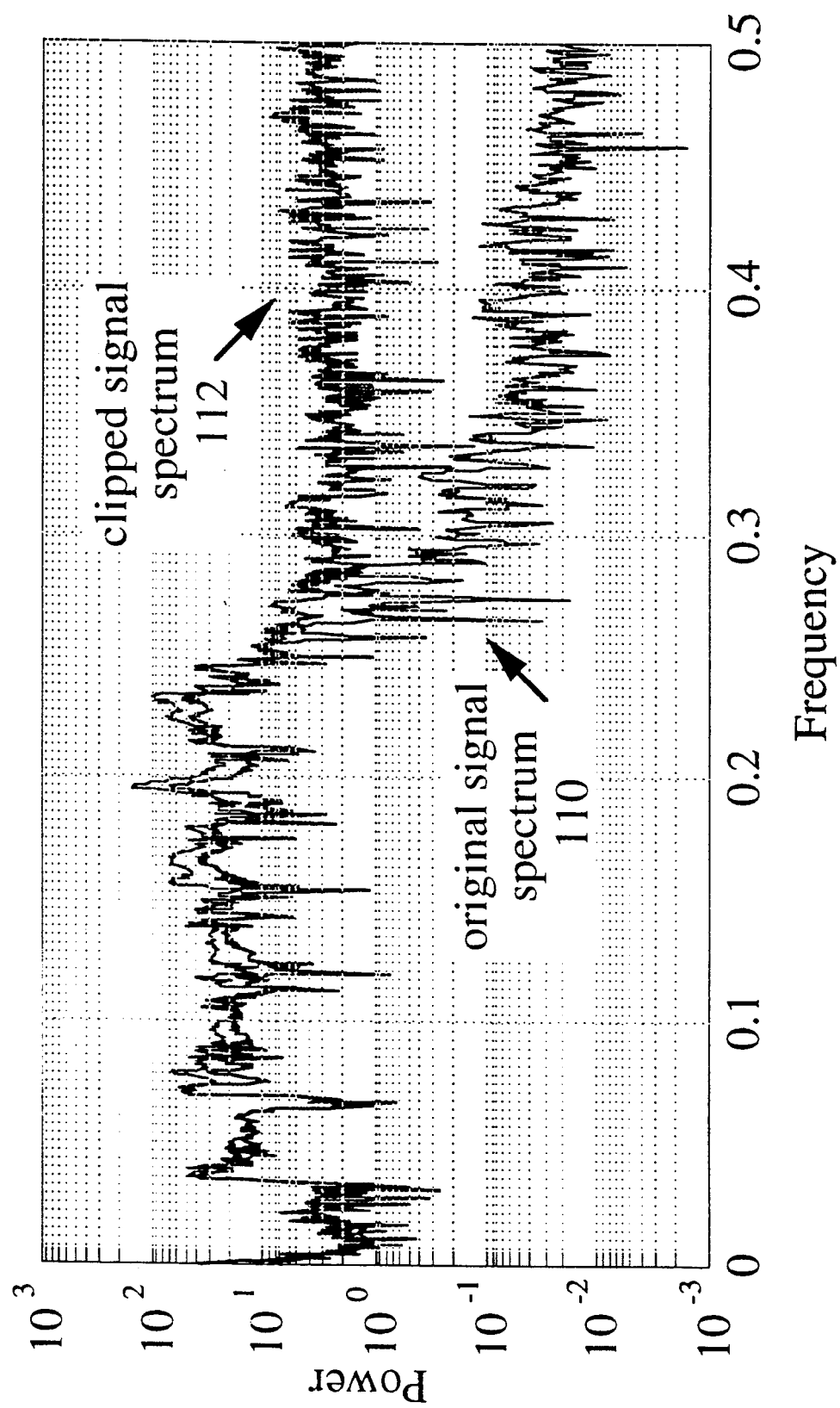
Figure 18:
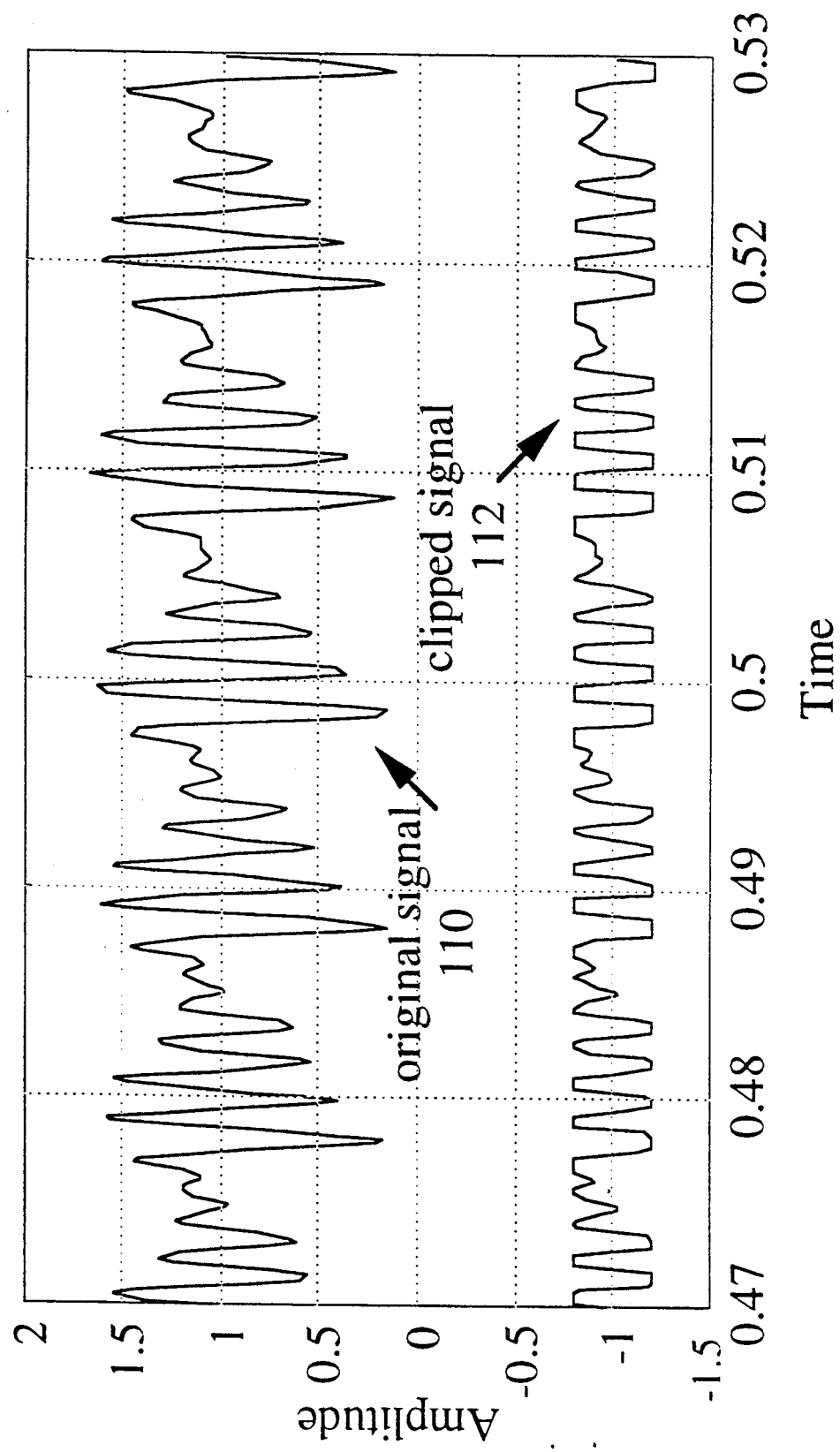
Figure 19:
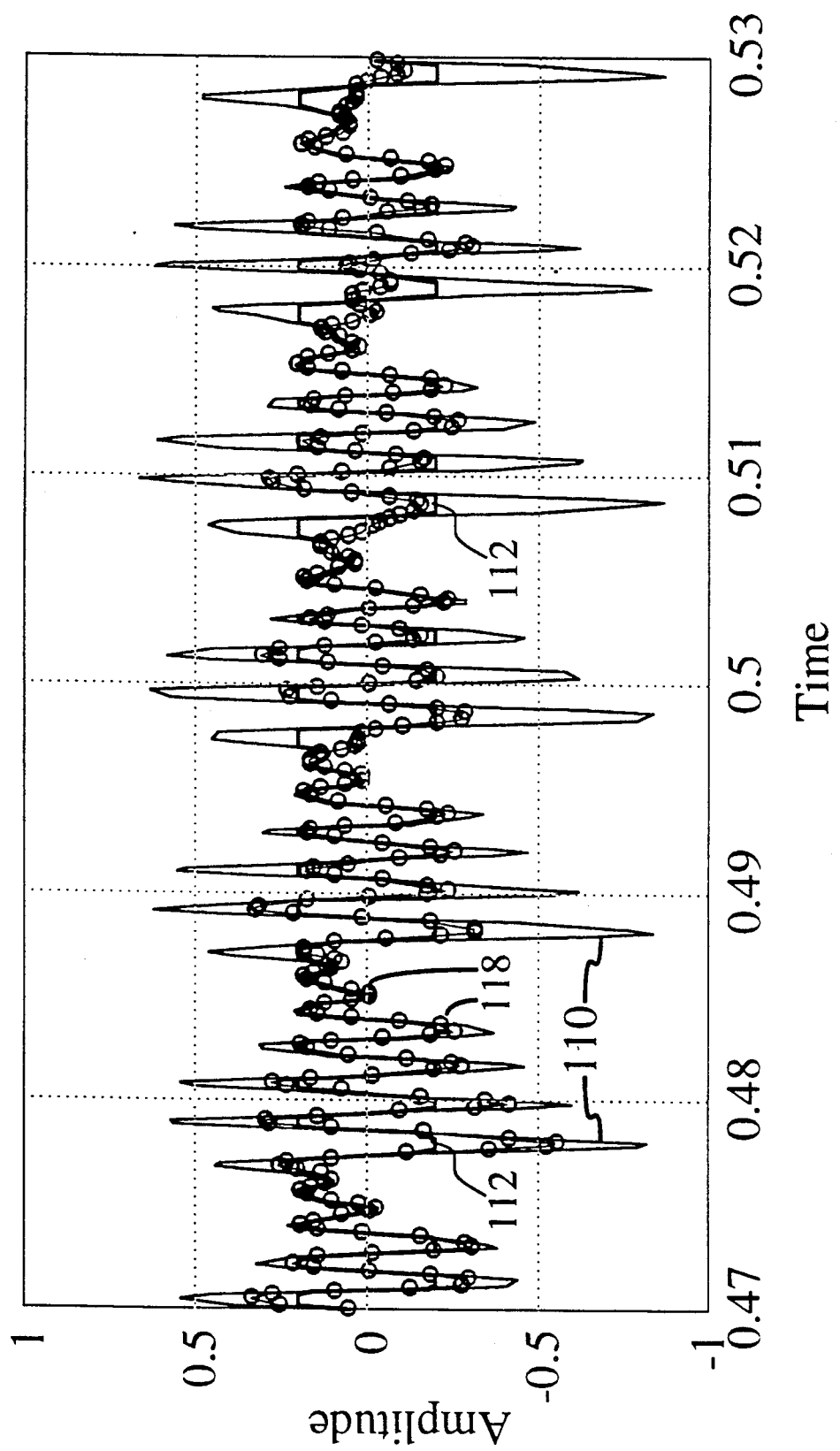
Figure 20:
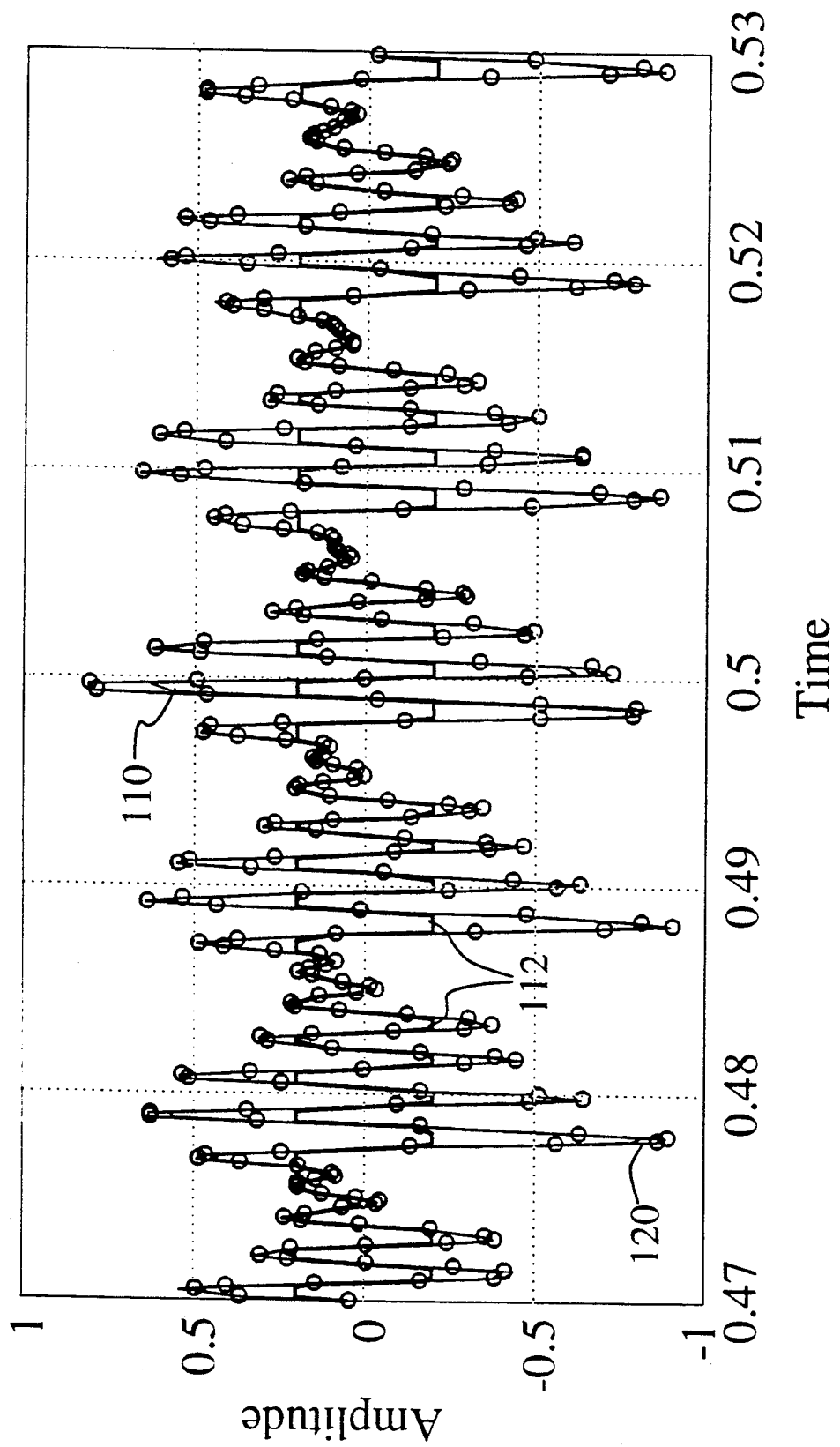
Figure 21:
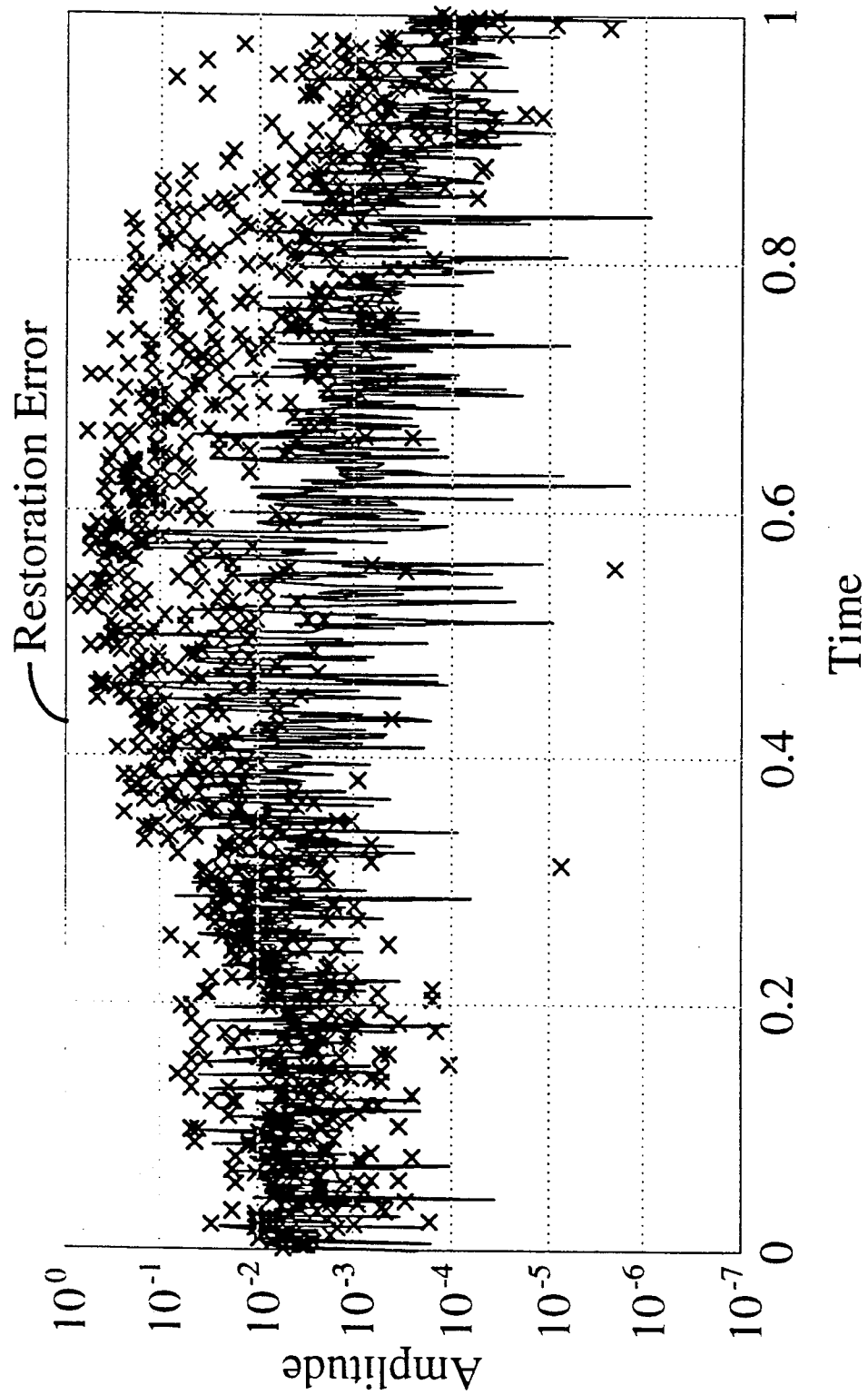

FIGS. 16–21 show results obtained with restoration of an original signal 110 in the form of 1 second of recorded speech, which was clipped as shown at 112. In FIG. 17, original spectrum 114 falls off more than clipped spectrum 116. FIG. 18 shows detail of the original signal 110 and the clipped signal 112 at about the 0.5 second point (see also FIG. 16). FIG. 19 shows the original signal 110, clipped signal 112 at the 0.2 level, and a restored signal 118 (delineated by circles) obtained using conventional interpolation techniques based on selection of the minimum energy signal. FIG. 20 shows the original signal 110, clipped signal 112 and a restored signal 120 obtained using inequality constraints in accordance with the invention. As can be seen, the restored signal 120 matches the original signal 110 much more closely than does the restored signal 118. FIG. 21 shows this result quantitatively, with the x's representing the results for the conventionally restored signal 118.

It should be apparent to those skilled in the art that various changes in form and details of the invention as shown and described may be made. It is intended that such changes be included within the spirit and scope of the claims appended hereto.

What is claimed is:

1. A system for restoring an original signal clipped at a clipping level, said system comprising:
   means for providing clipping level information regarding said clipping level;
   means for providing bandwidth information regarding said original signal; and
   a signal restorer responsive to said clipped original signal, said clipping level information, and said bandwidth information for generating a restored signal providing an approximation of said original signal not clipped at said clipping level.

2. The system of claim 1 further comprising:
   means for providing weighting information selected from the group consisting essentially of bandwidth weighting, spectral weighting, and temporal weighting;
   wherein said signal restorer is also responsive to said weighting information for generating said restored signal.

3. The system of claim 1 wherein said signal restorer includes:
   means responsive to said clipping level information for generating clipping location information indicating where said original signal has been clipped;
   means responsive to said bandwidth information for generating bandwidth constraint information for constraining the bandwidth of said restored signal;
   means responsive to said clipping information and said bandwidth constraint information for generating restoration information; and
   means responsive to said clipped original signal, said clipping information, and said restoration information for producing said restored signal.

4. The system of claim 1 wherein:
   said clipped original signal is represented by a series of clipped and unclipped samples of said original signal;
   said signal restorer includes:
      means responsive to said clipping level information for generating a clipping matrix for identifying said clipped and unclipped samples;
      means responsive to said bandwidth information for generating a bandwidth constraint matrix for constraining the bandwidth of said restored signal;
      means responsive to said clipped original signal, said clipping matrix, and said bandwidth constraint matrix for generating restoration adjustment samples; and
      means responsive to said series of clipped and unclipped samples, said clipping matrix, and said restoration adjustment samples for producing a series of samples representing said restored signal.

5. The system of claim 1 wherein:
   said clipped version of said original signal is represented by a vector, c, including clipped and unclipped samples of said original signal and said restored signal is represented by a vector, r, including said unclipped samples and restored versions of said clipped samples;
   said signal restorer includes:
      means responsive to said clipping level information for generating a clipping matrix $T_c$ for identifying said clipped and unclipped samples of said original signal;
      means responsive to said vector c and said clipping matrix $T_c$ for generating a vector z representing samples for adjusting said vector c to produce said vector r; and
      means responsive to said vector c, said clipping matrix $T_c$, and said vector z for producing said vector r according to the relationship $r = c + T_c z$.

6. The system of claim 5 wherein:
   said signal restorer further includes means responsive to said bandwidth information for generating a bandwidth constraint matrix $B^{195}$ for constraining the bandwidth of said restored version of said original signal; and
   said means for generating said vector z includes means for computing said vector z by minimizing the relationship $J(z) = \| c + T_c z \|_w$, subject to the constraints $z \geq 0$ and $B^{195}(T_c z + c) = 0$, where the weighting W may be selected from the group consisting essentially of bandwidth weighting, spectral weighting, and temporal weighting.

7. The system of claim 1 wherein:
   said clipped original signal is represented by a vector c including clipped and unclipped samples of said original signal and said restored signal is represented by a vector r including said unclipped samples and restored versions of said clipped samples;
   said signal restorer includes:
      means responsive to said bandwidth information for generating a bandwidth limiting matrix $\Gamma$ for limiting the bandwidth of said restored signal;
      means responsive to said vector c and said bandwidth limiting matrix $\Gamma$ for generating a vector x representing restoration samples; and
      means responsive to said vector x and said bandwidth limiting matrix $\Gamma$ for producing said vector r according to the relationship $r = \Gamma x$.

8. The system of claim 7 wherein:
   said signal restorer further includes means responsive to said clipping level information for generating a clipping matrix $T_c$ for identifying said clipped sampled values and a clipping matrix $T_s$ for identifying said unclipped sample values;
   said means for generating said vector x includes means for computing said vector x by minimizing the relationship $J(z) = |\Gamma x|_w$, subject to the constraints $T_s(r - c) = 0$ and $T_c(r - c) \geq 0$, where the weighting W may be selected from the group consisting essentially of bandwidth weighting, spectral weighting, and temporal weighting.

9. The system of claim 1 wherein:
   said clipped version of said original signal is represented by a vector c including clipped and unclipped samples of said original signal and said restored version of said original signal is represented by a vector r including said unclipped samples and restored versions of said clipped samples;
   said signal restorer includes:
      means responsive to said clipping level information for generating a clipping matrix $T_c$ for identifying said clipped samples and a clipping matrix $T_s$ for identifying said unclipped samples;

means responsive to said vector c and said clipping matrices $T_c$ and $T_s$ for generating a vector z representing restoration adjustment samples; and means responsive to said vector c, said clipping matrix $T_c$, and said vector z for producing said vector r according to the relationship $r = c + T_c z$.

10. The system of claim 9 wherein:

said signal restorer further includes means responsive to said bandwidth information for generating a bandwidth constraint matrix B for constraining the bandwidth of said restored version of said original signal; and said means for generating said vector z includes means for computing said vector z by minimizing the relationship $J(z) = |c + T_c z|_w + |T_s(B(c + T_c z) - c)|_v$, subject to the constraint $z > 0$, where the weighting W is selected from the group consisting essentially of bandwidth weighting, spectral weighting, and temporal weighting and the weighting V emphasizes particular ones of said unclipped samples over other ones of said unclipped samples.

11. The system of claim 1 wherein said signal restorer includes:

means for segmenting said clipped original signal into clipped segments representing original segments of said original signal clipped at said clipping level;

means responsive to said plurality of segments, said clipping level information, and said bandwidth information for generating restored segments providing approximations of said original segments not clipped at said clipping level;

means for cross fading said restored segments; and means for delaying and summing said cross faded restored segments to produce said restored signal.

12. The system of claim 1 wherein:

said clipped original signal exhibits a non-linear amplification; and said signal restorer includes means for applying an inverse of said non-linear amplification to said clipped original signal.

13. The system of claim 1 wherein:

said clipped original signal exhibits a compressing-type non-linear amplification;

said system further comprises means for further clipping said clipped original signal over a range at which amplification of said clipped original signal is at least approximately linear; and said signal restorer is responsive to said further clipped original signal for producing said restored signal.

14. The system of claim 1, wherein:

said clipped original signal exhibits hysteresis;

said system further comprises means for providing hysteresis information regarding said clipped original signal; and said signal restorer is also responsive to said hysteresis information for producing said restored signal.

15. A method of restoring an original signal clipped at a clipping level, said method comprising the steps of:

providing clipping level information regarding said clipping level;

providing bandwidth information regarding said original signal; and in response to said clipped original signal, said clipping level information, and said bandwidth information, generating a restored signal providing an approximation of said original signal not clipped at said clipping level.

16. The method of claim 15 further comprising the steps of:

providing weighting information selected from the group consisting essentially of bandwidth weighting, spectral weighting, and temporal weighting;

wherein said step of generating said restored signal is further in response to said weighting information.

17. The method of claim 15 wherein said step of generating said restored signal further includes the steps of:

in response to said clipping level information, generating clipping information indicating where said original signal has been clipped;

in response to said bandwidth information, generating bandwidth constraint information for constraining the bandwidth of said restored signal;

in response to said clipping information and said bandwidth constraint information, generating restoration information; and in response to said clipped original signal, said clipping information, and said restoration information, producing said restored signal.

18. The method of claim 15 wherein:

said clipped original signal is represented by a series of clipped and unclipped samples of said original signal;

said step of generating said restored signal includes the steps of:

in response to said clipping level information, generating a clipping matrix for identifying said clipped and unclipped samples;

in response to said bandwidth information, generating a bandwidth constraint matrix for constraining the bandwidth of said restored signal;

in response to said clipped original signal, said clipping matrix, and said bandwidth constraint matrix, generating restoration adjustment samples; and in response to said series of clipped and unclipped samples, said clipping matrix, and said restoration adjustment samples, producing a series of samples representing said restored signal.

19. The method of claim 15 wherein:

said clipped version of said original signal is represented by a vector, c, including clipped and unclipped samples of said original signal and said restored signal is represented by a vector, r, including said unclipped samples and restored versions of said clipped samples;

said step of generating said restored signal includes the steps of:

in response to said clipping level information, generating a clipping matrix $T_c$ for identifying said clipped and unclipped samples of said original signal;

in response to said vector c and said clipping matrix $T_c$, generating a vector z representing samples for adjusting said vector c to produce said vector r; and in response to said vector c, said clipping matrix $T_c$, and said vector z, producing said vector r according to the relationship $r = c + T_c z$.

20. The method of claim 19 wherein:

said step of generating said restored signal further includes the step of, in response to said bandwidth information, generating a bandwidth constraint matrix $B^\perp$ for constraining the bandwidth of said restored version of said original signal; and said step of generating said vector z includes the step of computing said vector z by minimizing the relationship $J(z)=|c+T_c z|_w$, subject to the constraints $z \geq 0$ and $B^\perp(T_c z+c)=0$, where the weighting W is selected from the group consisting essentially of bandwidth weighting, spectral weighting, and temporal weighting.

21. The method of claim 15 wherein:

said clipped original signal represented by a vector c including clipped and unclipped samples of said original signal and said restored signal is represented by a vector r including said unclipped samples and restored versions of said clipped samples;

said step of generating said restored signal includes the steps of:

in response to said bandwidth information, generating a bandwidth limiting matrix $\Gamma$ for limiting the bandwidth of said restored signal;

in response to said vector c and said bandwidth limiting matrix $\Gamma$, generating a vector x representing restoration samples; and in response to said vector x and said bandwidth limiting matrix $\Gamma$, producing said vector r according to the relationship $r=\Gamma x$.

22. The method of claim 21 wherein:

said step of generating said restored signal further includes the step of, in response to said clipping level information, generating a clipping matrix $T_c$ for identifying said clipped sampled values and a clipping matrix $T_s$ for identifying said unclipped sample values;

said step of generating said vector x includes the step of computing said vector x by minimizing the relationship $J(z)=|\Gamma x|_w$, subject to the constraints $T_s(r-c)=0$ and $T_c(r-c)\geq 0$, where the weighting W is selected from the group consisting essentially of bandwidth weighting, spectral weighting, and temporal weighting.

23. The method of claim 15 wherein:

said clipped version of said original signal is represented by a vector c including clipped and unclipped samples of said original signal and said restored version of said original signal is represented by a vector r including said unclipped samples and restored versions of said clipped samples;

said step of generating said restored signal includes:

in response to said clipping level information, generating a clipping matrix $T_c$ for identifying said clipped samples and a clipping matrix $T_s$ for identifying said unclipped samples;

in response to said vector c and said clipping matrices $T_c$ and $T_s$, generating a vector z representing restoration adjustment samples; and in response to said vector c, said clipping matrix $T_c$, and said vector z, producing said vector r according to the relationship $r=c+T_c z$.

24. The method of claim 23 wherein:

said step of generating said restored signal further includes the step of, in response to said bandwidth information, generating a bandwidth constraint matrix B for constraining the bandwidth of said restored version of said original signal; and said step of generating said vector z includes the step of computing said vector z by minimizing the relationship $J(z)=|c+T_c z|_w+|T_s(B(c+T_c z)-c)|_v$, subject to the constraint $z \geq 0$, where the weighting W is selected from the group consisting essentially of bandwidth weighting, spectral weighting, and temporal weighting and the weighting V emphasizes particular ones of said unclipped samples over other ones of said unclipped samples.

25. The method of claim 15 wherein said step of generating said restored signal includes the steps of:

segmenting said clipped original signal into clipped segments representing original segments of said original signal clipped at said clipping level;

in response to said plurality of segments, said clipping level information, and said bandwidth information, generating restored segments providing approximations of said original segments not clipped at said clipping level;

cross fading said restored segments; and delaying and summing said cross faded restored segments to produce said restored signal.

26. The method of claim 15 wherein:

said clipped original signal exhibits a non-linear amplification; and said step of generating said restored signal includes the step of applying an inverse of said non-linear amplification to said clipped original signal.

27. The method of claim 15 wherein:

said clipped original signal exhibits a compressing-type non-linear amplification;

said method further comprises the step of further clipping said clipped original signal over a range at which amplification of said clipped original signal is at least approximately linear; and said step of generating said restored signal is in response to said further clipped original signal.

28. The method of claim 15 wherein:

said clipped original signal exhibits hysteresis;

said method further comprises the step of providing hysteresis information regarding said clipped original signal; and said step of generating said restored signal is also in response to said hysteresis information.

* * * * *